(12) United States Patent
Hidaka

(10) Patent No.: US 11,856,160 B2
(45) Date of Patent: Dec. 26, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keita Hidaka, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/176,764

(22) Filed: Mar. 1, 2023

(65) Prior Publication Data

US 2023/0283722 A1 Sep. 7, 2023

(30) Foreign Application Priority Data

Mar. 7, 2022 (JP) ................................ 2022-034258

(51) Int. Cl.
| | |
|---|---|
| *H04N 1/00* | (2006.01) |
| *H04N 1/52* | (2006.01) |
| *H04N 1/60* | (2006.01) |
| *G06K 15/02* | (2006.01) |

(52) U.S. Cl.
CPC ..... *H04N 1/00395* (2013.01); *G06K 15/1876* (2013.01); *H04N 1/00806* (2013.01); *H04N 1/52* (2013.01); *H04N 1/6041* (2013.01)

(58) Field of Classification Search
CPC ......... G06K 19/06037; G06K 15/1876; B65H 2701/31; H04N 7/18; H04N 7/181; H04N 23/00; H04N 7/183; H04N 23/51; H04N 23/55; H04N 21/8456; H04N 23/80; H04N 5/33; H04N 23/90; H04N 1/00395;
(Continued)

(56) References Cited

U.S. PATENT DOCUMENTS

| | | | |
|---|---|---|---|
| 11,347,980 B2 * | 5/2022 | Katoh | .................. G06K 15/027 |
| 2005/0007609 A1 * | 1/2005 | Itagaki | ............... H04N 1/40068 |
| | | | 358/1.9 |

(Continued)

FOREIGN PATENT DOCUMENTS

| | | |
|---|---|---|
| JP | 2013-148863 A | 8/2013 |
| JP | 2019-092034 A | 6/2019 |

*Primary Examiner* — Negussie Worku
(74) *Attorney, Agent, or Firm* — Venable LLP

(57) ABSTRACT

An object is to save a user's trouble in a case of printing correction charts and stabilization charts and performing automatic tone correction with the correction charts among the printed charts. An image processing apparatus performs: control for printing correction chart images along with identification images for respectively identifying the correction chart images on print media in a one-to-one correspondence; and control for printing a stabilization chart image on a print medium before the control for printing the correction chart images. Then, from among scan images obtained by reading correction charts and one or more stabilization charts, the apparatus identifies the scan images respectively corresponding to the correction charts based on the identification images appearing in the scan images, the correction charts each being obtained by printing a correction chart image along with the corresponding identification image, the stabilization charts each being obtained by printing the stabilization chart image.

18 Claims, 10 Drawing Sheets

(58) Field of Classification Search
CPC .... H04N 1/00806; H04N 1/52; H04N 1/6041;
H04N 21/47
USPC ........................................................ 358/1.13
See application file for complete search history.

(56) References Cited

U.S. PATENT DOCUMENTS

| | | | |
|---|---|---|---|
| 2010/0182617 A1* | 7/2010 | Une .................... | H04N 1/6027 |
| | | | 358/1.9 |
| 2012/0206756 A1* | 8/2012 | Nakashio ............. | H04N 1/6033 |
| | | | 358/1.14 |
| 2013/0235430 A1* | 9/2013 | Sakatani ............... | B41J 29/393 |
| | | | 358/3.23 |
| 2015/0091963 A1* | 4/2015 | Yamanaka ............. | B41J 2/155 |
| | | | 347/14 |
| 2016/0379099 A1* | 12/2016 | Togashi ............... | H04N 1/6044 |
| | | | 358/1.9 |
| 2019/0132454 A1* | 5/2019 | Fukase ............... | H04N 1/00045 |
| 2022/0050410 A1* | 2/2022 | Hirose ............... | G03G 15/5062 |
| 2022/0188584 A1* | 6/2022 | Tomii ................ | H04N 1/00811 |

* cited by examiner

IMAGE PROCESSING APPARATUS, IMAGE PROCESSING METHOD, AND STORAGE MEDIUM

CROSS REFERENCE TO PRIORITY APPLICATION

This application claims the benefit of Japanese Patent Application No. 2022-034258, filed Mar. 7, 2022, which is hereby incorporated by reference herein in its entirety.

BACKGROUND

Field of the Invention

The present disclosure relates to a technology for tone conversion in image forming.

Description of the Related Art

There are image forming apparatuses such as copying machines that perform digital processing on data of an image obtained by reading a document with a scanner (hereinafter referred to as "scan image") (such data will hereinafter be referred to as "scan image data"), and print the scan image data subjected to the digital processing with a printer. With image forming apparatuses configured as above, forming an image on a print medium, such as a print sheet, with the printer without tone adjustment may impair the tonality of the image formed on the print medium (hereinafter referred to as "formed image"). Automatic tone correction is a technology for adjusting the tones of formed images in order to reduce the impairment of the tones of the formed images. In the automatic tone correction, a chart to be used in the automatic tone correction (hereinafter referred to as "correction chart") printed by the printer of an image forming apparatus is read with its scanner, and the printer's current tone characteristics are obtained based on the scan image obtained by the read. Moreover, a conversion table for converting the tones of print images so as to achieve predetermined tonality on formed images is generated based on the obtained tone characteristics.

Japanese Patent Laid-Open No. 2019-92034 discloses the following technology. In the technology disclosed in Japanese Patent Laid-Open No. 2019-92034, firstly, a plurality of correction charts placed on an automatic document feeder (ADF) are sequentially read with a scanner. Note that the plurality of correction charts are intended for a plurality of types of automatic tone correction aimed at different purposes. Next, the plurality of types of automatic tone correction corresponding to the correction charts are performed using the plurality of scan images obtained by the read with the scanner. With the technology disclosed in Japanese Patent Laid-Open No. 2019-92034, the user can perform a plurality of types of automatic tone correction aimed at different types of correction with a single operation and instruction by placing a plurality of correction charts on the ADF and causing the scanner to sequentially read them. Also, Japanese Patent Laid-Open No. 2013-148863 discloses a technology for printing a chart for stabilizing color appearance (hereinafter referred to as "stabilization chart"), which is not for use in automatic tone correction, immediately before printing a correction chart. According to the technology disclosed in Japanese Patent Laid-Open No. 2013-148863, printing the stabilization chart immediately before printing the correction chart will make the temperature of a fixing unit stable when the correction chart is printed. This stabilizes the color appearance of the correction chart.

In the technology disclosed in Japanese Patent Laid-Open No. 2019-92034, the correction charts are intended for a plurality of types of tone correction aimed at different purposes as automatic tone correction. Thus, in a case of printing the stabilization chart immediately before printing each of the correction charts and sequentially reading these charts with the scanner, the user will have to pull out the plurality of correction charts out of the plurality of printed charts without fail. Moreover, the user will have to make read the plurality of correction charts thus pulled out with the scanner in a predetermined order.

SUMMARY

An image processing apparatus comprising: one or more hardware processors; and one or more memories storing one or more programs configured to be executed by the one or more hardware processors, the one or more programs including instructions for: performing control for printing a print image on a print medium; obtaining data of a scan image obtained by reading a document; and generating a conversion table for converting a tone of the scan image, wherein control for printing a plurality of correction chart images along with identification images on a plurality of the print media in a one-to-one correspondence is performed, the plurality of correction chart images being aimed at different purposes for tone correction, the identification images being for respectively identifying the plurality of correction chart images, control for printing a stabilization chart image on one or more of the print media is performed before performing the control for printing the plurality of correction chart images, the stabilization chart image being for stabilizing the printing of the plurality of correction chart images, data of a plurality of scan images are obtained, the plurality of scan images being obtained by reading a plurality of correction charts and one or more stabilization charts as a plurality of the documents, the plurality of correction charts being obtained by printing the correction chart images along with the identification images corresponding to the correction chart images on a plurality of the print media in a one-to-one correspondence, the stabilization charts being obtained by printing the stabilization chart image on a plurality of the print media in a one-to-one correspondence, and the scan images respectively corresponding to the plurality of correction charts are identified from among the plurality of scan images based on the identification images appearing in the scan images, and a plurality of the conversion tables are generated using the scan images respectively corresponding to the plurality of identified correction charts.

Further features of the present invention will become apparent from the following description of exemplary embodiments with reference to the attached drawings.

DESCRIPTION OF THE EMBODIMENTS

Hereafter, with reference to the attached drawings, the present invention is explained in detail in accordance with preferred embodiments. Configurations shown in the following embodiments are merely exemplary and the present invention is not limited to the configurations shown schematically.

Embodiment 1

Figure 1:
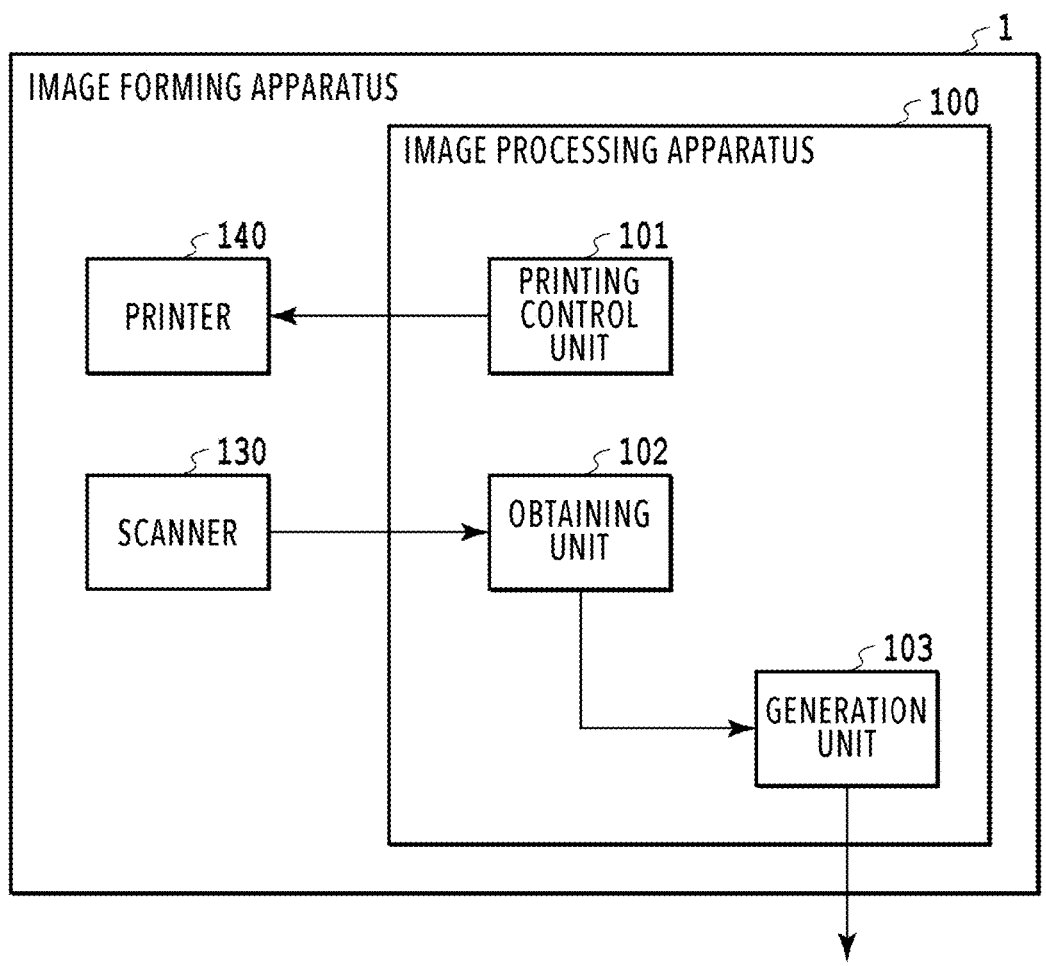
FIG. 1 is a block diagram illustrating an example of functional blocks in an image processing apparatus according to Embodiment 1.

An image processing apparatus 100 according to Embodiment 1 will be described with reference to FIGS. 1 to 8. FIG. 1 is a block diagram illustrating an example of functional blocks in the image processing apparatus 100 according to Embodiment 1. The image processing apparatus 100 includes a printing control unit 101, an obtaining unit 102, and a generation unit 103. Processes by the units included in the image processing apparatus 100 are implemented by hardware such as an application specific integrated circuit (ASIC) incorporated in the image processing apparatus 100. The above processes may be implemented by hardware such as a field programmable gate array (FPGA). Alternatively, the above processes may be implemented by software using a memory such as random access memory (RAM) and a central processing unit (CPU). Details of the processes by the functional blocks illustrated in FIG. 1 will be described later.

Figure 2:
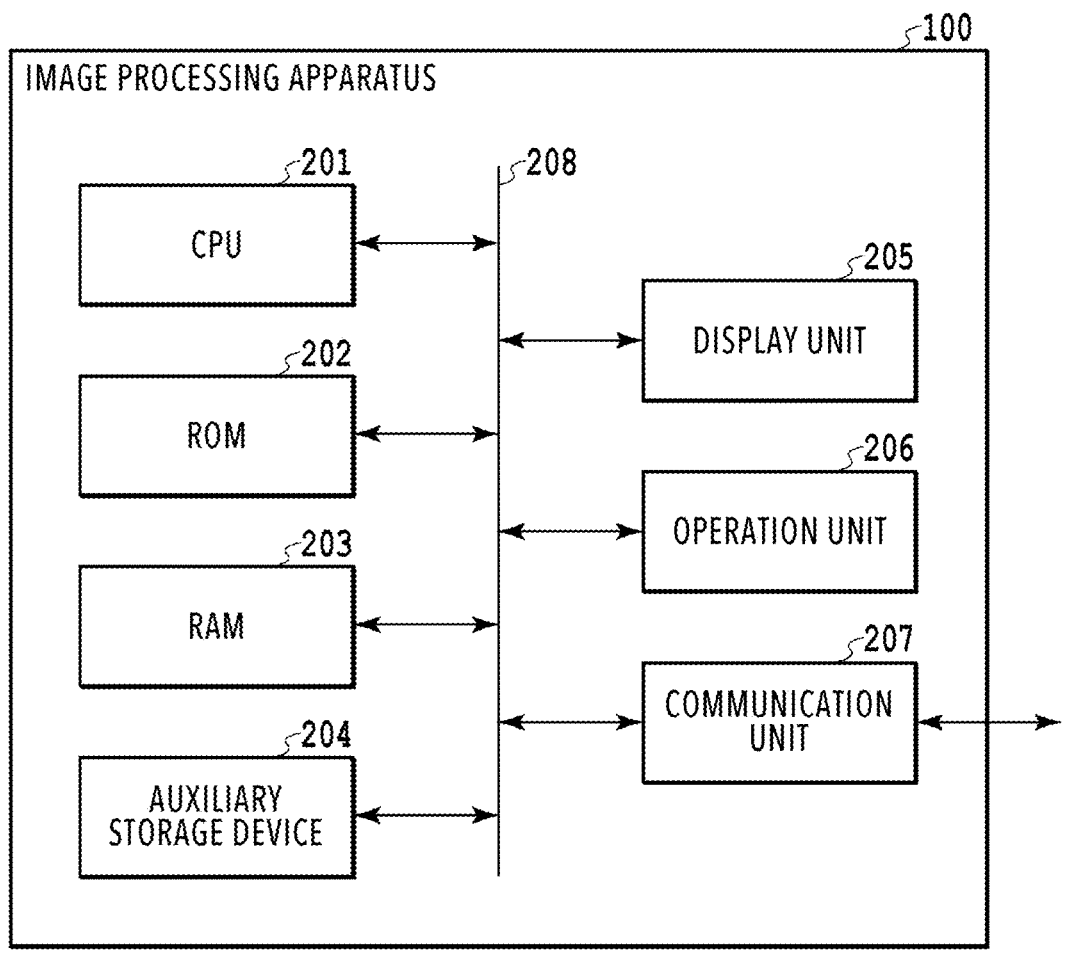
FIG. 2 is a block diagram illustrating an example of the hardware configuration of the image processing apparatus according to Embodiment 1.

A hardware configuration of the image processing apparatus 100 according to Embodiment 1 in a case where the functional blocks included in the image processing apparatus 100 function as pieces of software will be described with reference to FIG. 2. FIG. 2 is a block diagram illustrating an example of the hardware configuration of the image processing apparatus 100 according to Embodiment 1. The image processing apparatus 100 is a computer. As exemplarily illustrated in FIG. 2, this computer has a CPU 201, a ROM 202, a RAM 203, an auxiliary storage device 204, a display unit 205, an operation unit 206, a communication unit 207, and a bus 208.

The CPU 201 is a processor that controls the computer by using programs or data stored in the ROM 202, the RAM 203, or the like such that the computer functions as the functional blocks included in the image processing apparatus 100 illustrated in FIG. 1. The image processing apparatus 100 may have one or more dedicated pieces of hardware other than the CPU 201, and at least part of processing by the CPU 201 may be executed by the dedicated pieces of hardware. Examples of the dedicated pieces of hardware include an ASIC, an FPGA, a digital signal processor (DSP), and the like. The ROM 202 is a memory storing programs requiring no change and the like. The RAM 203 is a memory that temporarily stores programs or data supplied from the auxiliary storage device 204, data externally supplied via the communication unit 207, or the like. The auxiliary storage device 204 is, for example, a hard disk drive and stores various pieces of data such as pieces of image data or audio data.

The display unit 205 is, for example, a liquid crystal display, an light-emitting diode (LED) display, or the like and displays GUIs for a user to operate the image processing apparatus 100 or browse the status of processing in the image processing apparatus 100. The operation unit 206 is, for example, a keyboard, a mouse, a joystick, a touch panel, or the like and inputs various instructions into the CPU 201 in response to receiving the user's operations. The CPU 201 also operates as a display control unit that controls the display unit 205 and as an operation control unit that controls the operation unit 206.

The communication unit 207 is used for communication between the image processing apparatus 100 and external apparatuses such as sending and receiving data and the like. For example, in a case where the image processing apparatus 100 is wired-connected to an external apparatus, a communication cable is connected to the communication unit 207. In a case where the image processing apparatus 100 has a function of wirelessly communicating with an external apparatus, the communication unit 207 includes an antenna. The bus 208 connects the units included in the image processing apparatus 100 and transfers information to and from them. Embodiment 1 will be described on the assumption that the display unit 205 and the operation unit 206 are present inside the image processing apparatus 100. However, at least one of the display unit 205 or the operation unit 206 may be present as a separate apparatus outside the image processing apparatus 100.

As illustrated in FIG. 1, the image processing apparatus 100 is used in an image forming apparatus 1, for example. The image forming apparatus 1 is an apparatus configured as a multifunction printer (MFP) or the like, and includes a printer 140, a scanner 130, and the image processing apparatus 100. The printer 140 and the scanner 130 are connected to the image processing apparatus 100 via the communication unit 207. The printer 140 prints a print image on a print medium, such as a print sheet, in response to receiving data of the print image output from the image processing apparatus 100. The scanner 130 optically reads (hereinafter expressed as "scans") a document. The scanner 130 outputs data of the image obtained by scanning the document (hereinafter referred to as "scan image") (the data will hereinafter be referred to as "scan image data") to the image processing apparatus 100.

Figure 3:
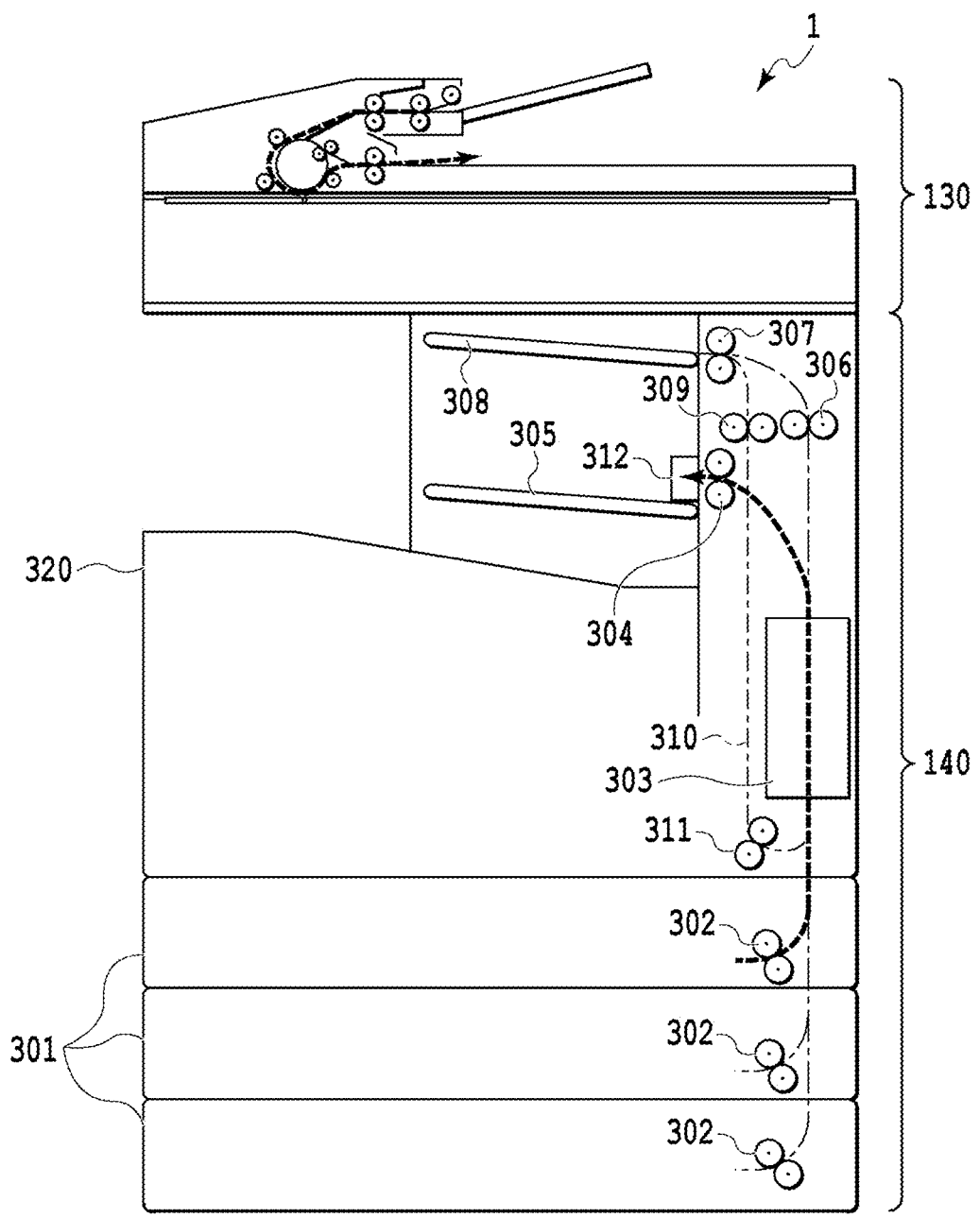
FIG. 3 is an exterior view illustrating an example of the exterior of an image forming apparatus according to Embodiment 1.

The printer 140 and the scanner 130 will be described with reference to FIGS. 3 and 4. FIG. 3 is an exterior view illustrating an example of the exterior of the image forming apparatus 1 according to Embodiment 1. The image processing apparatus 100 is accommodated inside a housing 320, for example. In the image forming apparatus 1 exemplarily illustrated in FIG. 3, the scanner 130 is disposed on top of the printer 140. Sheet feed cassettes 301 store print media therein, such as print sheets. The image forming apparatus 1 illustrated in FIG. 3 exemplarily has three sheet feed cassettes 301, but the number of sheet feed cassettes 301 is not limited to three. Guide rollers 302 feed print media stored in the sheet feed cassettes 301 to a printing unit 303. At this time, in a case where a later-described sheet overlap amount has been set, the print media are conveyed with such timing that part of the current page print medium will overlap the preceding page print medium.

The printing unit 303 prints an image on a print medium fed thereto. The printing unit 303 may be of an inkjet method which prints an image by jetting inks onto a print medium, or of an electrophotographic method which prints an image by fixing toners to a print medium. A print medium after printing by the printing unit 303 is discharged onto a sheet discharge tray 305 by guide rollers 304. In a case of double-sided printing, the print medium is firstly sent to a sheet discharge tray 308 by feed rollers 306 and 307, not by the guide rollers 304, and then sent to a double-sided printing conveyance path 310 by the feed rollers 307 and feed rollers 309 rotated in the reverse direction. Thereafter, the print medium is conveyed by guide rollers 311 back to the printing unit 303 again. A stapling device 312 staples print media output onto the sheet discharge tray 305.

Figure 4:
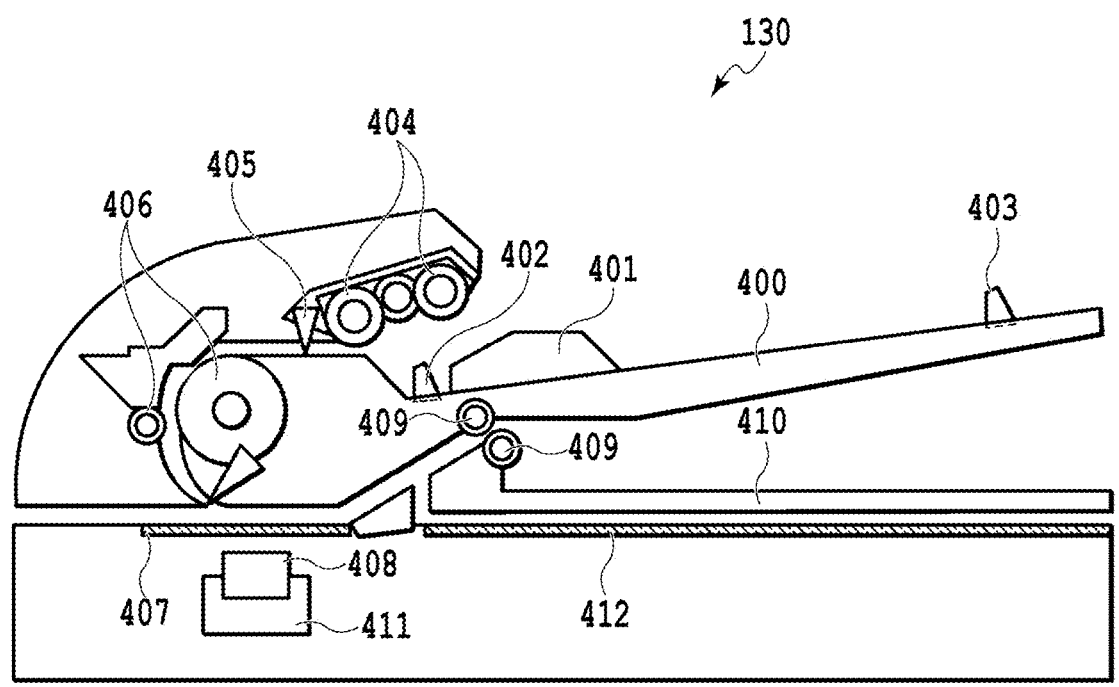
FIG. 4 is a cross-sectional side view illustrating an example of the internal structure of a scanner according to Embodiment 1.

FIG. 4 is a cross-sectional side view illustrating an example of the internal structure of the scanner 130 according to Embodiment 1. A document tray 400 is a tray to place documents to be read (hereinafter simply referred to as "documents"). On the document tray 400 are provided: a document sensor 402 that detects whether a document is placed on the document tray 400; two document guides 401; and a detection sensor 403 that detects the size of the document. The two document guides 401 are provided so as to be aligned in the longitudinal direction of the document (the direction perpendicular to the conveyance direction of the document in the plane in which the document is placed). The document placed on the document tray 400 is conveyed by three sets of rollers, namely, pick-up rollers 404, guide rollers 406, and discharge rollers 409. The pick-up rollers 404 are rollers that convey the document placed on the document tray 400 to a document conveyance path. The guide rollers 406 convey the document conveyed into the document conveyance path by the pick-up rollers 404. The discharge rollers 409 convey the document conveyed thereto by the guide rollers 406 to a sheet discharge tray 410.

A detection sensor 405 that detects passage of a document detects the document conveyed by the pick-up rollers 404. Whether the document has passed is determined based on the result of the detection. The guide rollers 406, the pick-up rollers 404, and the discharge rollers 409 are driven by a stepping motor not illustrated in FIG. 4, for example. The document tray 400, the document guides 401, the document sensor 402, the detection sensors 403 and 405, the pick-up rollers 404, the guide rollers 406, the discharge rollers 409, and the sheet discharge tray 410 form an auto document feeder (ADF) unit.

Sub scanning thinning processing at the ADF unit is implemented by setting the driving pulse of the stepping motor for driving the guide rollers 406, the pick-up rollers 404, the discharge rollers 409 at a double frequency. When the document conveyed by the ADF unit passes over a reading window 407, the document is scanned by a contact image sensor (CIS) 408 included in a sensor unit 411 under the reading window 407. The sensor unit 411 is freely movable in the sub scanning direction, and is also movable in the same direction as the conveyance direction of the document conveyed from the guide rollers 406 toward the discharge rollers 409. Note that the reading window 407 has a certain length in the sub scanning direction, and the CIS 408 can be moved to any position within that range of length and read a document from the moved position.

The CIS 408 includes photoelectric conversion elements, such as charge coupled device (CCD) elements. The CIS 408 performs first-in, first-out (FIFO) processing for accumulating data of an image read by the photoelectric conversion elements, and also generates control signals for controlling the FIFO processing and the photoelectric conversion elements. Generally, the CIS 408 is configured of a plurality of photoelectric conversion elements arranged in an array. The sensor unit 411 is provided with one or more light sources not illustrated which illuminate a document through the reading window 407 or a reading window 412 of a platen. Generally, a plurality of light sources are provided side by side in an array. The light sources are generally, but not limited to, LEDs. In a case where the user sets a document on the platen instead of on the document tray 400, the sensor unit 411 is moved to under the reading window 412 of the platen, and the document is scanned with the CIS 408 through the reading window 412 while the sensor unit 411 is moved in the sub scanning direction.

The processes by the functional blocks included in the image processing apparatus 100 illustrated in FIG. 1 will be described. The printing control unit 101 performs control for printing (forming) a print image on a print medium. Specifically, the printing control unit 101 outputs data of a print image to the printer 140 via the communication unit 207 to control the printer 140 such that it prints the print image on a print medium. More specifically, the printing control unit 101 performs control for printing a plurality of correction chart images aimed at different purposes for automatic tone correction on a plurality of print media in a one-to-one correspondence. The printing control unit 101 also performs control for printing a stabilization chart image on a print medium, the stabilization chart image being for stabilizing the printing of the plurality of correction chart images.

Here, automatic tone correction refers to, for example, a process of generating or correcting conversion tables, such as lookup tables, to be used in tone conversion for generating a halftone pattern by performing image processing such as error diffusion processing and screen processing on a scan image. In the automatic tone correction, it is generally necessary to generate or correct conversion tables for a plurality of types of image processing such as error diffusion processing and screen processing. That is, the plurality of correction chart images aimed at different purposes for the automatic tone correction are images for generating or correcting conversion tables respectively corresponding to different types of image processing such as error diffusion processing or screen processing by the automatic tone correction. Also, to stabilize the printing of a correction chart image is, for example, to stabilize the color appearance of the correction chart image formed on a print medium when the image is printed on the print medium. Specifically, in the case where the printer 140 is of an electrophotographic method, to stabilize the printing of a correction chart image is, for example, to stabilize the temperature of the fixing unit not illustrated that is included in the printer 140. In the case where the printer 140 is of an inkjet method, to stabilize the printing of a correction chart image is, for example, to achieve a state with no or reduced clogging or the like of the nozzles not illustrated.

The printing control unit 101 performs the control for printing, on a print medium, the stabilization chart image for stabilizing the printing of each correction chart image before performing the control for printing each correction chart image. Note that, the printing control unit 101 may perform control as below in a case where the (n+1)-th (n is an integer of 1 or more) correction chart image can be stably printed after performing the control for printing the n-th correction chart image. For example, in this case, the printing control unit 101 consecutively performs the control for printing the n-th correction chart image and the control for printing the (n+1)-th correction chart image. In other words, in this case, the printing control unit 101 may omit the control for printing the stabilization chart image on a print medium before performing the control for printing the (n+1)-th correction chart image. The printer 140 prints the correction chart images and the stabilization chart image on print media based on the control by the printing control unit 101. In the following description, a print media on which either correction chart image is printed will be referred to as "correction chart", and a print medium on which the stabilization chart image is printed will be referred to as "stabilization chart".

The printing control unit 101 performs the control for printing the stabilization chart image on a number of print media to be output designated in advance (hereinafter referred to as "designated output number") before performing the control for printing the correction chart images. In this case, the printer 140 prints a stabilization chart as many times as the designated output number before the printing of each correction chart. In the case where the printing control unit 101 consecutively performs the control for printing the n-th correction chart image and the control for printing the (n+1)-th correction chart image, the printer 140 consecutively prints the n-th correction chart and then the (n+1)-th correction chart.

Here, the designated output number is designated based on input operations by the user, for example. The number of repetitions of printing of the stabilization chart image required to reach a state where the correction chart images can be stably printed may be pre-designated as an initial value of the designated output number. A configuration for designating the designated output number based on input operations by the user will be described with reference to FIGS. 5A and 5B. The following description will be given on the assumption that the operation unit 206 is a touch panel and the user performs input operations by touching GUI screens displayed on the display unit 205.

Figure 5A:
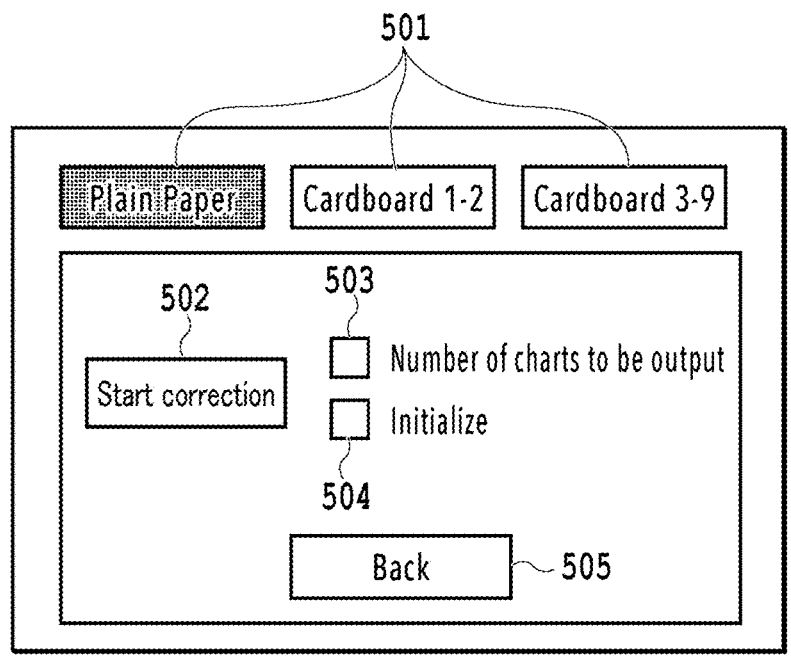
FIGS. 5A and 5B are diagrams illustrating an example of graphical user interface (GUI) screens displayed on a display unit of the image processing apparatus according to Embodiment 1.
Figure 5B:
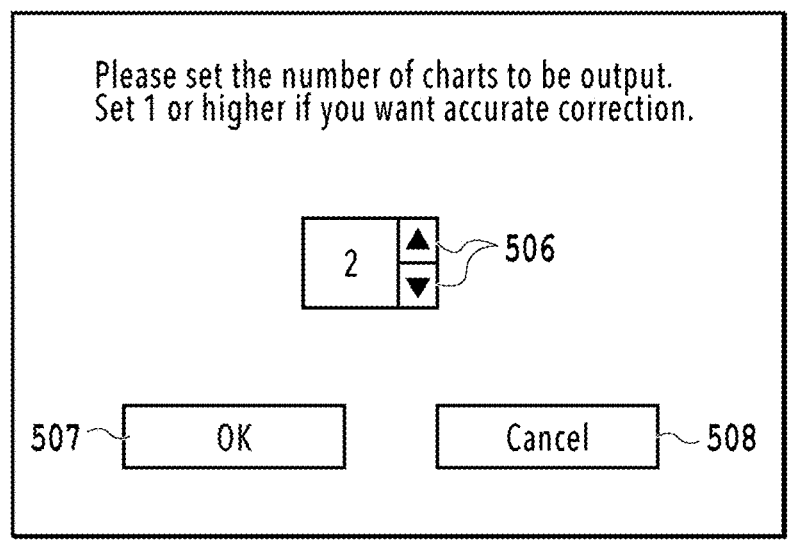

FIGS. 5A and 5B are diagrams illustrating an example of the GUI screens displayed on the display unit 205 of the image processing apparatus 100 according to Embodiment 1. Specifically, FIG. 5A is a diagram illustrating an example of a GUI screen for configuring settings of the automatic tone correction displayed on the display unit 205 according to Embodiment 1. On the GUI screen exemplarily illustrated in FIG. 5A, the user performs input operations to configure the settings of the automatic tone correction and issues an instruction to start executing the automatic tone correction.

Buttons 501 are input operation buttons for selecting the type of print medium with which to perform the automatic tone correction. The following description will exemplarily be given on the assumption that the printer 140 is of an electrophotographic method. Generally, electrophotographic printers perform printing well by switching the printing speed according to the basis weight of the print medium. Also, electrophotographic printers switch the conversion table that are referred to for tone conversion of a scan image according to the printing speed. This enables optimal tone conversion. For this reason, each conversion table is held in the auxiliary storage device 204 in association with information indicating a printing speed. The printing control unit 101 loads conversion tables to the RAM 203 when the image forming apparatus 1 is booted or performs printing, and use them in tone conversion processing for a print image when performing control for printing the print image on a print medium.

The user selects the type of print medium with which the user wishes to perform the automatic tone correction by pressing the button 501 to thereby designate configuration of settings for generating or updating the conversion tables to be used for the printing speed corresponding to the selected type of print medium. Note that the buttons 501 are not essential components in the GUI screen illustrated in FIG. 5A, and may be omitted. In this case, the image processing apparatus 100 may be configured to, for example, reflect the result of the automatic tone correction on the conversion tables corresponding to the each printing speed. Also, pressing one of the input operation buttons mentioned here is not limited to an operation of actually depressing the input operation button and may, for example, be an operation of touching the region on the GUI screen displaying the input operation button with a finger, a stylus, or the like.

A button 502 is an input operation button for issuing an instruction to start executing the automatic tone correction. Operations after being pressed the button 502 with an input operation by the user will be described later. A button 503 is an input operation button for transitioning to a GUI screen for designating the number of stabilization charts to be output. In a case where the button 503 is pressed with an input operation by the user, the display transitions to the GUI screen for designating the number of stabilization charts to be output. The GUI screen for designating the number of stabilization charts to be output will be described later. A button 504 is an input operation button for initializing the conversion values listed in the conversion tables back to initial values. Appropriate conversion tables may not be obtained if the automatic tone correction is performed in a state where conversion values in the conversion tables are obviously abnormal values for some reason. The user can set the conversion values in the conversion tables back to the initial values by pressing the button 504.

A button 505 is an input operation button for terminating the automatic tone correction without executing it. The GUI screen illustrated in FIG. 5A is a mere example. The GUI screen for configuring the settings of the automatic tone correction may include input operation buttons as below not illustrated in FIG. 5A. For example, an input operation button may be included which is for designating whether to place the correction charts and the stabilization charts on the platen and read them or to place the correction charts and the stabilization charts on the document tray 400 of the ADF unit and read them when performing automatic tone correction. Moreover, for example, an input operation button may be included which is for designating another type of automatic tone correction such as one in which tone patches are output inside the image forming apparatus 1 and the output tone patches are read with a color sensor inside the image forming apparatus 1.

FIG. 5B is a diagram illustrating an example of a GUI screen, displayed on the display unit 205 according to Embodiment 1, for designating the number of stabilization charts to be output when performing the automatic tone correction.

Buttons 506 are input operation buttons for setting the number of stabilization charts to be output. In a case where the execution of the automatic tone correction starts with the number of stabilization charts to be output set at 0, no stabilization chart will be printed and only the correction charts will be printed. In a case where the execution of the automatic tone correction starts with the number of stabilization charts to be output set at m (m is a positive integer), a total of m+1 charts including m stabilization charts and one correction chart will be printed for each correction chart image. That is, in this case, printing of m+1 charts as one set corresponding to a correction chart image is repeated for all correction chart images.

A button 507 is an input operation button for determining the number of stabilization charts to be output set with the buttons 506 as the designated output number. The value of the designated output number is saved to the RAM 203. After the button 507 is pressed, the display transitions to the GUI screen illustrated in FIG. 5A. A button 508 is an input operation button for causing the display to transition to the GUI screen illustrated in FIG. 5A without determining the number of stabilization charts to be output set with the buttons 506 as the designated output number.

The execution of the automatic tone correction starts in a case where the button 502 in the GUI screen illustrated in FIG. 5A is pressed with an input operation by the user. Note that, after the button 502 is pressed with an input operation by the user, sheet feed information indicating the type of print medium to be used to print the charts may be obtained and then the execution of the automatic tone correction may be started. Specifically, for example, after the button 502 is pressed with an input operation by the user, the display is caused to transition to a GUI screen not illustrated in FIG. 5A or 5B for selecting the sheet feed cassette 301 in which the print media to be used to print the charts are set from among the plurality of sheet feed cassettes 301. In this case, the execution of the automatic tone correction is started after the sheet feed cassette 301 is selected with an input operation by the user. In response to starting the execution of the automatic tone correction, the printing control unit 101 performs control for printing all correction chart images and the stabilization chart image on print media, and the printer 140 prints all correction charts and stabilization charts. After the printing control unit 101 completes the control for printing all correction chart images and the stabilization chart image, a GUI screen not illustrated in FIG. 5A or 5B for receiving an input operation for starting reading the charts is displayed on the display unit 205.

Figure 6:
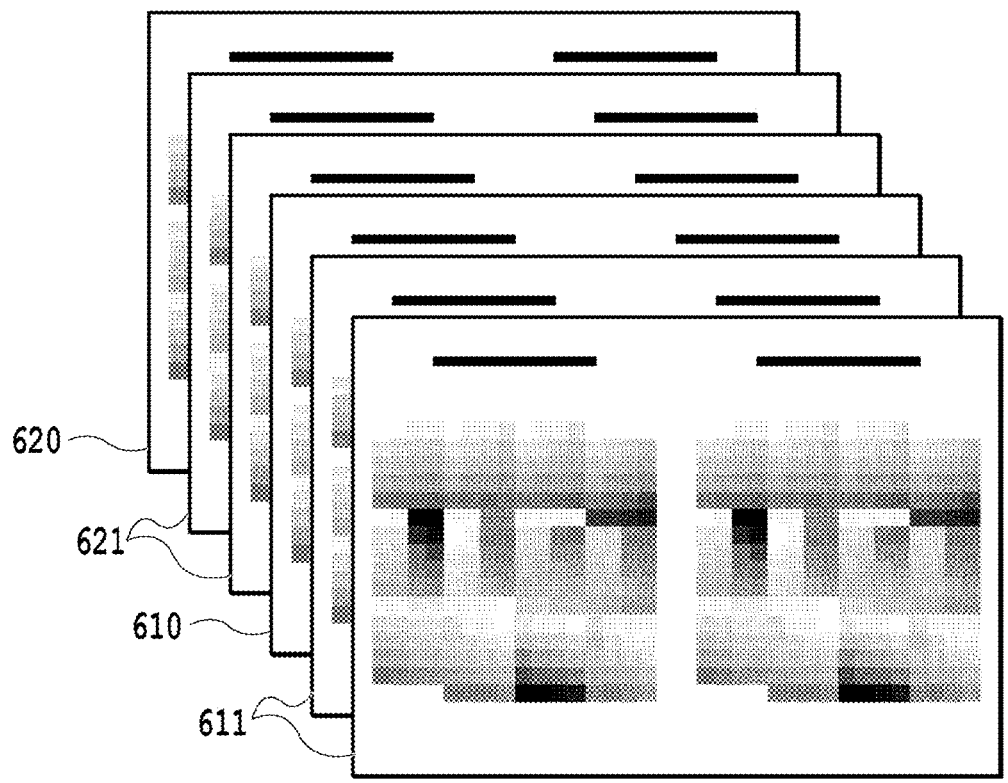
FIG. 6 is a diagram illustrating an example of the configurations of correction charts and stabilization charts output from a printer in a case of performing automatic tone correction according to Embodiment.

Correction charts 610 and 620 and stabilization charts 611 and 621 will be described with reference to FIG. 6. FIG. 6 is a diagram illustrating an example of the configurations of the correction charts 610 and 620 and the stabilization charts 611 and 621 output from the printer 140 in a case of performing the automatic tone correction according to Embodiment 1. Note that the configurations of the correction charts 610 and 620 and the stabilization charts 611 and 621 illustrated in FIG. 6 exemplarily represent a case where two correction chart images aimed at different purposes for the automatic tone correction are printed on print media and the designated output number is two. In FIG. 6, the printed surfaces of the correction charts 610 and 620 and the stabilization charts 611 and 621 face the near side. In reality, however, the correction charts 610 and 620 and the stabilization charts 611 and 621 are output from the printer 140 with their near side and far side facing the opposite directions to the directions in FIG. 6.

As illustrated in FIG. 6, in the case where the designated output number is two, two first stabilization charts 611 are firstly printed and output from the printer 140, and subsequently one first correction chart 610 is printed and output from the printer 140. Thereafter, two second stabilization charts 621 are printed and output from the printer 140, and lastly one second correction chart 620 is printed and output from the printer 140. As a result, six charts are output in an overlapping state. Note that the first correction chart 610 is for generating or updating a conversion table for error diffusion processing, for example, and the second correction chart 620 is for generating or updating a conversion table for screen processing, for example. The stabilization charts 611 and the stabilization charts 621 may be different from or same to each other.

As exemplarily illustrated in FIG. 6, the plurality of stabilization charts 611 and 621 and the two correction charts 610 and 620 are output from the printer 140 in an overlapping state. It is therefore not convenience for the user to pull out only the correction charts and place them on the ADF unit of the document tray 400. Thus, it is desirable from the viewpoint of convenience that the plurality of stabilization charts 611 and 621 and the two correction charts 610 and 620 be all placed on the document tray 400 of the ADF unit in the overlapping state in which they were output from the printer 140.

The obtaining unit 102 obtains scan image data. Specifically, the obtaining unit 102 obtains scan image data by controlling the scanner 130 via the communication unit 207 to cause the scanner 130 to scan a document. More specifically, the obtaining unit 102, for example, controls the ADF unit via the communication unit 207 to cause the ADF unit to sequentially convey one or more documents placed on the document tray 400 and causes the scanner 130 to scan the documents.

After all charts are output from the printer 140, the user places the plurality of charts output from the printer 140, which include stabilization charts, on the document tray 400 in the order in which they were output from the printer 140. The obtaining unit 102 causes the scanner 130 to sequentially scan the plurality of charts placed on the document tray 400, and obtains pieces of scan image data corresponding to the charts in the order in which the charts are placed on the document tray 400. In a case where the image forming apparatus 1 does not include the ADF unit or the user performs an input operation on a GUI screen not illustrated in FIG. 5A or 5B to choose not to use the ADF unit, the user sequentially places the plurality of charts on the platen and causes the scanner 130 to scan each chart.

The generation unit 103 generates (updates) conversion tables for tone conversion of scan images. Specifically, based on the pieces of scan image data corresponding to the plurality of correction charts among those corresponding to the plurality of charts obtained by the obtaining unit 102, the generation unit 103 generates (updates) conversion tables respectively corresponding to the correction charts.

More specifically, the generation unit 103 firstly identifies the pieces of scan image data respectively corresponding to the plurality of correction charts from among the plurality of pieces of scan image data based on the designated output number mentioned above. For example, in a case where the designated output number is two and a chart sheaf including the plurality of charts exemplarily illustrated in FIG. 6 are output from the printer 140, the generation unit 103 identifies the pieces of scan image data corresponding to the correction charts as follows. In this case, the generation unit 103 firstly identifies the first two pieces of scan image data, which represents the designated output number, from the first obtained piece of scan image data among the plurality of pieces of scan image data as stabilization charts. Then, the generation unit 103 identifies the third piece of scan image data as the piece of scan image data corresponding to the first correction chart. Furthermore, the generation unit 103 identifies the two pieces of scan image data, which represents the designated output number, from the fourth obtained piece of scan image data among the plurality of pieces of scan image data, i.e., the fourth and fifth obtained pieces of scan image data, as stabilization charts. Then, the generation unit 103 identifies the sixth piece of scan image data as the piece of scan image data corresponding to the second correction chart.

The above may be more generalized as follows. Specifically, the generation unit 103 identifies the piece of scan image data at a sequential position representing a number derived by multiplying the sum of the designated output number and 1 by any natural number as the piece of scan image data corresponding to a correction chart. After identifying the pieces of scan image data corresponding to the correction charts, the generation unit 103 generates (updates) conversion tables by using the plurality of identified pieces of scan image data. In the case where the printing control unit 101 has performed the control for consecutively printing the n-th correction chart and then the (n+1)-th correction chart, the generation unit 103 may simply identify the plurality of correction charts by following the order of the charts output from the printer 140. How to generate (update) conversion tables for tone conversion of scan images by using the pieces of scan image data corresponding to the plurality of correction charts has been well known, and detailed description thereof is therefore omitted.

Figure 7:
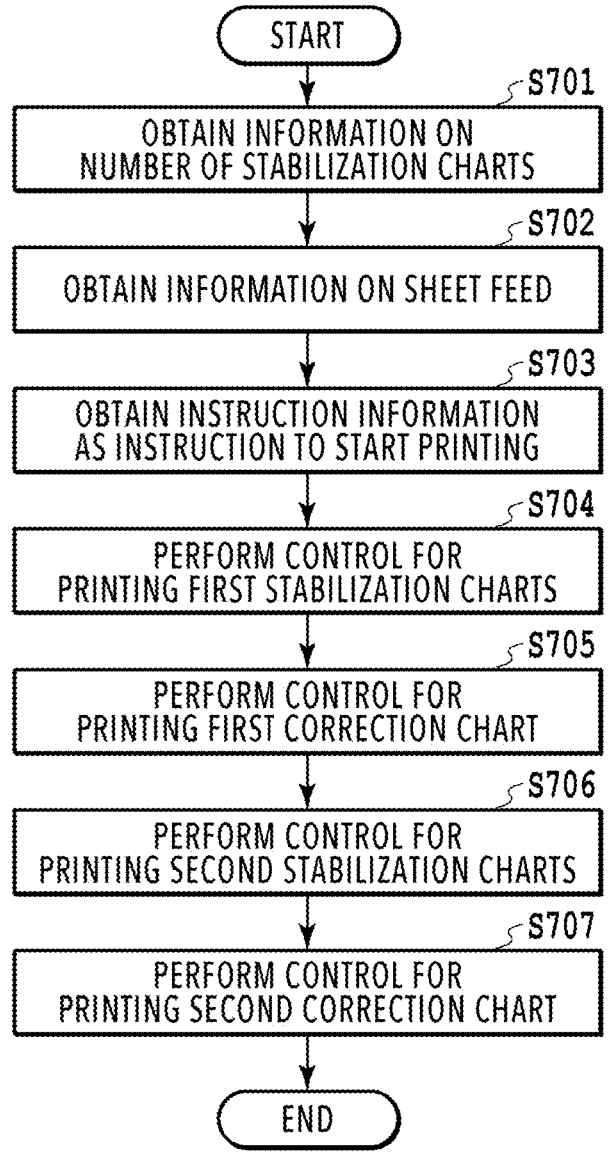
FIG. 7 is a flowchart illustrating an example of a processing flow until the image processing apparatus according to Embodiment 1 causes the printer to output a plurality of correction charts and stabilization charts.

Operation of the image processing apparatus 100 will be described with reference to FIGS. 7 and 8. Note that "S" in the following description means a step. FIG. 7 is a flowchart illustrating an example of a processing flow until the image processing apparatus 100 according to Embodiment 1 causes the printer 140 to output a plurality of correction charts and stabilization charts. The following description will be given on the assumption that the designated output number is two, and the image processing apparatus 100 causes the printer 140 to output the two correction charts 610 and 620 aimed at different purposes for the automatic tone correction.

Firstly, in S701, the image processing apparatus 100 (CPU 201) obtains information indicating the designated output number. Then, in S702, the image processing apparatus 100 (CPU 201) obtains information on sheet feed. Then, in S703, being instructed to start the automatic tone correction with an input operation by the user, the image processing apparatus 100 (CPU 201) obtains instruction information as an instruction to start printing a plurality of charts including stabilization charts. Then, in S704, the printing control unit 101 controls the printer 140 to cause it to print two first stabilization charts 611. Then, in S705, the printing control unit 101 controls the printer 140 to cause it to print a first correction chart 610. Then, in S706, the printing control unit 101 controls the printer 140 to cause it to print two second stabilization charts 621. Then, in S707, the printing control unit 101 controls the printer 140 to cause it to print a second correction chart 620. FIG. 7 exemplarily illustrates the processing flow from S704 to S707 as separate processes. The configuration may, however, be such that the print jobs in the processes of S704 to S707 are consecutively output as a single print job, for example.

After S707, the printing control unit 101 terminates the processing of the flowchart illustrated in FIG. 7 and waits until it obtains instruction information as an instruction to start reading each chart output from the printer 140. After S707, the image processing apparatus 100 may display a GUI screen indicating that all charts have been output, prompting the user to place all of the output charts on the document tray 400, or prompting the user to scan all of the output charts one by one. After all charts are output from the printer 140, the user places all of the output charts on the document tray 400 in the same order. After placing all charts on the document tray 400, the user performs an input operation on a GUI screen not illustrated in FIG. 5A or 5B to issue an instruction to start reading.

Figure 8:
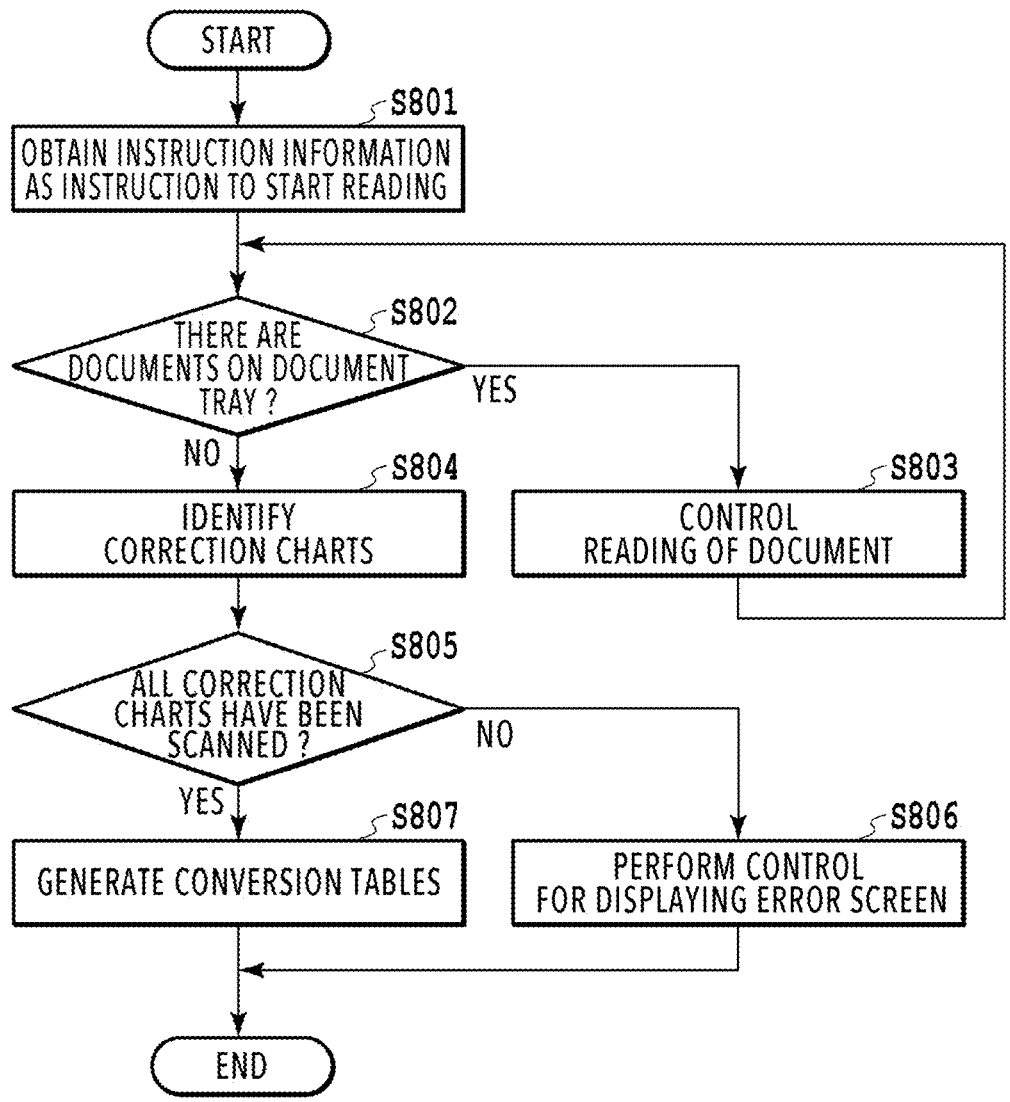
FIG. 8 is a flowchart illustrating an example of a processing flow in the image processing apparatus according to Embodiment 1 from reading of a plurality of correction charts and stabilization charts to generation (updating) of conversion tables.

FIG. 8 is a flowchart illustrating an example of a processing flow in the image processing apparatus 100 according to Embodiment 1 from reading of a plurality of correction charts and stabilization charts to generation (updating) of conversion tables. Firstly, in S801, the image processing apparatus 100 (CPU 201) obtains instruction information as an instruction to start reading the documents (charts). Then, in S802, the image processing apparatus 100 (CPU 201) determines whether there are documents (charts) on the document tray 400 based on information indicating the result of detection by the document sensor 402. If it is determined in S802 that there are documents (charts), then in S803, the obtaining unit 102 controls the reading of a document and obtains a piece of scan image data corresponding to the read chart. After S803, the image processing apparatus 100 returns to S802, and repeats the processes of S802 and S803 until being determined that there is no document (chart).

If it is determined in S802 that there is no document (chart), then in S804, the generation unit 103 identifies the pieces of scan image data corresponding to the correction charts out of the plurality of pieces of scan image data obtained in S803. After S804, the generation unit 103 determines in S805 whether all of the correction charts output from the printer 140 in the processing of the flowchart illustrated in FIG. 7 have been scanned. If even one of all correction charts is determined to have not been scanned in S805, then in S806, the image processing apparatus 100 (CPU 201) performs control for displaying a GUI screen indicating an error (error screen) on the display unit 205. If all correction charts are determined to have been scanned in S805, then in S807, the generation unit 103 generates (updates) conversion tables. After S807, the image processing apparatus 100 may display a GUI screen indicating that the automatic tone correction has been completed. After S806 or S807, the image processing apparatus 100 terminates the processing of the flowchart in FIG. 8.

While whether there are charts on the document tray 400 is determined in S802 based on the information indicating the result of detection by the document sensor 402, the process of S802 is not limited to this one. For example, whether the user has performed an input operation indicating that the scan has been completed may be determined in the case where the image forming apparatus 1 does not include the ADF unit or the user performs an input operation to choose not to use the ADF unit. In this case, whether the user has not performed an input operation designating start of a new scan over a predetermined period may be determined, for example. Moreover, in the case where at least one of all correction charts is determined to have not been scanned in S805, the pieces of scan image data corresponding to the identified correction charts may be used to generate (update) only conversion tables corresponding to these correction charts. Furthermore, after the process of S806, the image processing apparatus 100 may return to S801 and display a GUI screen that prompts the user to start reading all charts or an additional chart(s).

The image processing apparatus 100 configured as described above can save the user's trouble in a case of printing a plurality of correction charts and stabilization charts and performing automatic tone correction with the plurality of correction charts among the plurality of printed charts.

Embodiment 1 has been described on the assumption that a correction chart image to be used for automatic tone correction corresponding to one type of image processing is printed on one print medium. However, Embodiment 1 is not limited to this configuration. For example, two or more correction chart images to be used for automatic tone correction corresponding to two or more types of image processing, such as halftone line screen processing and halftone dot screen processing, may be printed on at least one of the first correction chart 610 or the second correction chart 620. In this case, the generation unit 103 uses a piece of scan image data corresponding to the correction chart on which the two or more correction chart images are printed to generate (update) conversion tables respectively corresponding to the two or more correction chart images.

Embodiment 2

An image processing apparatus 100 according to Embodiment 2 will be described with reference to FIGS. 9A, 9B, and 9C and FIGS. 10A and 10B. Like the image processing apparatus 100 according to Embodiment 1, the image processing apparatus 100 according to Embodiment 2 includes the printing control unit 101, the obtaining unit 102, and the generation unit 103. Moreover, like the image processing apparatus 100 according to Embodiment 1, the image processing apparatus 100 according to Embodiment 2 is used in the image forming apparatus 1, for example. Furthermore, like the image processing apparatus 100 according to Embodiment 1, processes by the units included in the image processing apparatus 100 according to Embodiment 2 are implemented by hardware such as an ASIC or an FPGA or software that uses a memory, such as a RAM, and a processor, such as a CPU.

The image processing apparatus 100 according to Embodiment 1 identifies pieces of scan image data corresponding to correction charts based on the designated output number. The image processing apparatus 100 according to Embodiment 2, on the other hand, identifies pieces of scan image data corresponding to correction charts based on identification images appearing in the scan images. For example, when placing a sheaf of charts output from the printer 140 on the document tray 400, the user may, for example, drop a part or entirety of the sheaf by mistake. In such an event, there is no guarantee that the sheaf is placed on the document tray 400 in the order in which the charts were output. If the order of the charts in the chart sheaf changes, the image processing apparatus 100 according to Embodiment 1 may erroneously identify the first and second correction charts 610 and 620 as the second and first correction charts 620 and 610, respectively. The image processing apparatus 100 according to Embodiment 1 may also erroneously identify the stabilization charts 611 and 621 as the first or second correction chart 610 or 620. This may result in a failure to generate right conversion tables to be generated or to update right conversion tables to be updated.

The image processing apparatus 100 according to Embodiment 2 (hereinafter simply referred to as "image processing apparatus 100") enables accurate identification of the first correction chart 610 and the second correction chart 620 even in the case where the order of the charts in the chart sheaf changes.

Figure 9A:
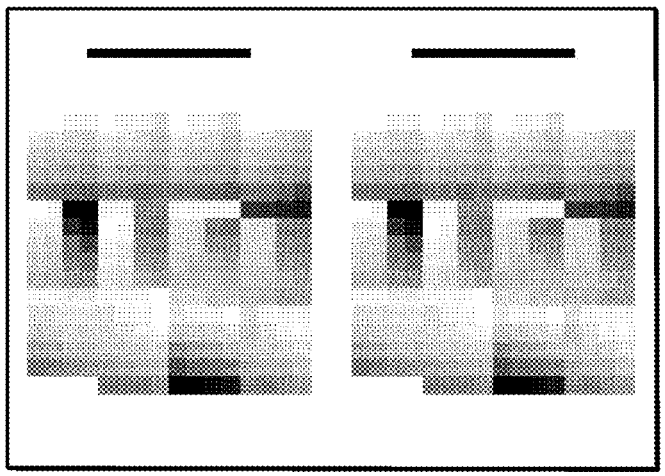
FIGS. 9A, 9B, and 9C are diagrams illustrating an example of a stabilization chart and correction charts output from a printer in a case where an image processing apparatus according to Embodiment 2 performs automatic tone correction.
Figure 9B:
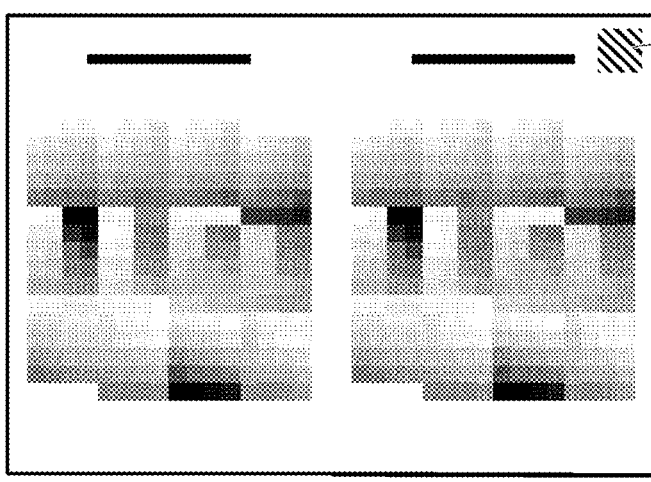
Figure 9C:
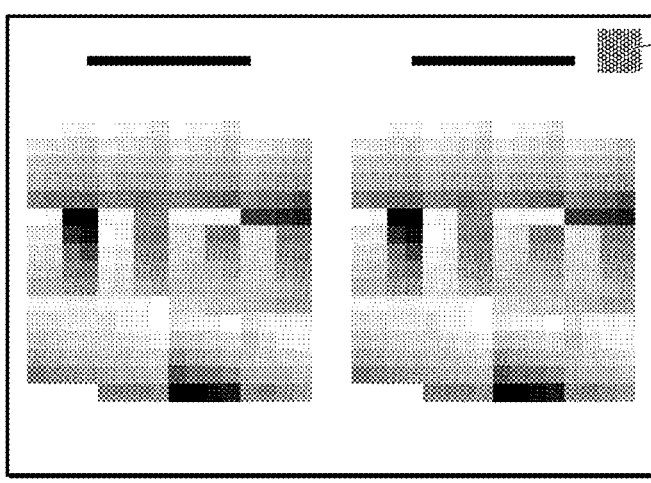

FIGS. 9A, 9B, and 9C are diagrams illustrating an example of a stabilization chart 900 and correction charts 910 and 920 output from the printer 140 in a case where the image processing apparatus 100 according to Embodiment 2 performs automatic tone correction. Specifically, FIG. 9A is a diagram illustrating an example of the stabilization chart 900 output from the printer 140 in a case of performing the automatic tone correction according to Embodiment 2. FIG. 9B illustrates an example of the first correction chart 910 output from the printer 140 in the case of performing the automatic tone correction according to Embodiment 2. FIG. 9C is likewise a diagram illustrating an example of the second correction chart 920.

In response to an instruction to start the automatic tone correction, the printing control unit 101 performs control for printing the correction charts 910 and 920 and the stabilization chart 900 such that they will be output in a predetermined order from the printer 140. Here, when the correction charts 910 and 920 are printed, the printing control unit 101 performs control such that identification images which makes the correction charts 910 and 920 identifiable from each other will be printed on the correction charts 910 and 920.

For example, to reach a state where the first correction chart image can be stably printed, the printing control unit 101 firstly performs control for printing the stabilization chart image to cause the printer 140 to output two stabilization charts 900. Subsequently, the printing control unit 101 performs control for printing the first correction chart image to cause the printer 140 to output the first correction chart 910. At this time, the printing control unit 101 performs the control such that an identification image 911 for identifying the first correction chart 910 will be printed on the first correction chart 910 in addition to the first correction chart image. Thereafter, to reach a state where the second correction chart image can be stably printed, the printing control unit 101 performs control for printing the stabilization chart image to cause the printer 140 to output two stabilization charts 900. Subsequently, the printing control unit 101 performs control for printing the second correction chart image to cause the printer 140 to output the second correction chart 920. At this time, the printing control unit 101 performs the control such that an identification image 921 for identifying the second correction chart 920 will be printed on the second correction chart 920 in addition to the first correction chart image.

Here, the identification images 911 and 921 only need to be in such forms as to render the first and second correction charts 910 and 920 identifiable, respectively. Specifically, the identification images 911 and 921 are, for example, images formed in mutually different colors. In one example, the identification image 911 is an image formed in cyan, and the identification image 921 is an image formed in magenta. The mutually different colors mentioned above are not limited to solid colors, such as cyan and magenta, and may be combinations of a plurality of mutually different colors or expressed with different tones of a solid color or the like. Alternatively, the identification images 911 and 921 may be images in mutually different shapes. For example, the identification image 911 may be a triangular image, and the identification image 921 may be a quadrangular image. Still alternatively, the identification images 911 and 921 may be, for example, images in the forms of one-dimensional codes, such as bar-codes, two-dimensional codes, such as QR codes (registered trademark), or the like in mutually different shapes. Yet alternatively, the identification images 911 and 921 may be images printed at mutually different positions on the correction charts.

An identification image corresponding to the identification images 911 and 921 illustrated in FIGS. 9B and 9C is not printed on the stabilization chart 900 illustrated in FIG. 9A. However, this is a mere example, and the configuration is not limited to this one. For example, the printing control unit 101 may perform the control for printing the stabilization chart 900 such that an identification image not illustrated in FIG. 9A for identifying the stabilization chart 900 will be printed on the stabilization chart 900 in addition to the stabilization chart image.

Figure 10A:
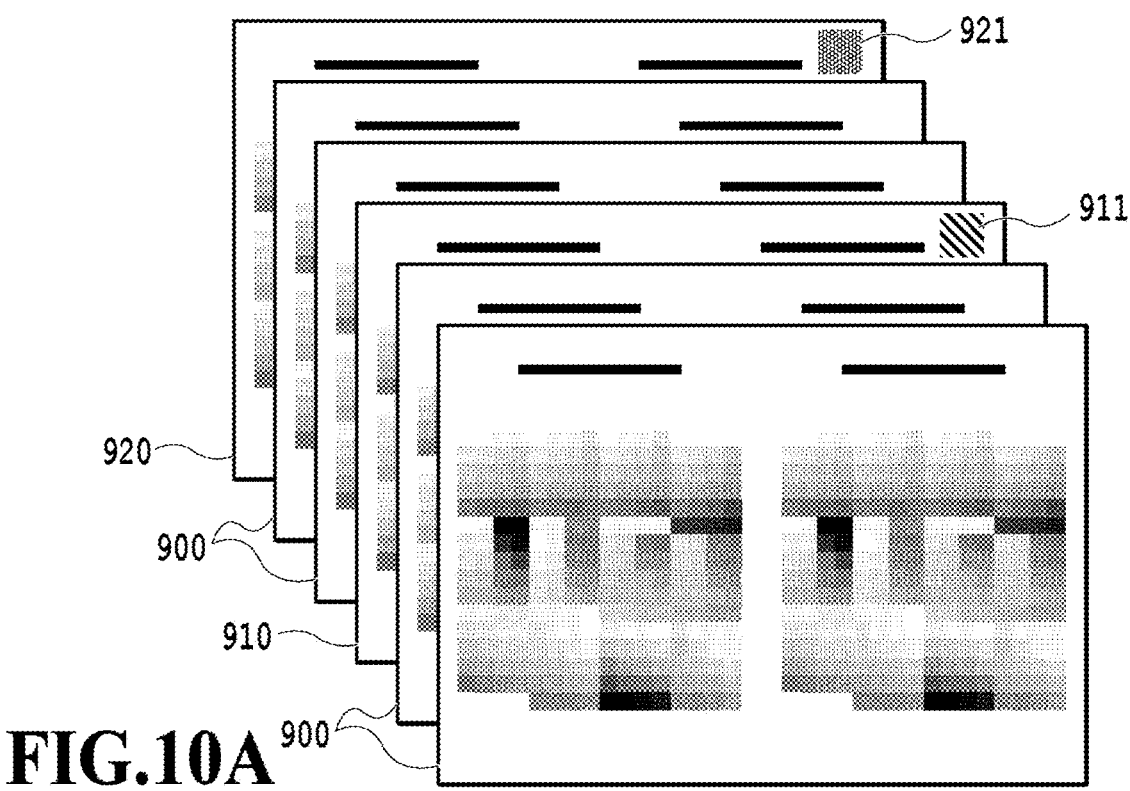
FIGS. 10A and 10B are diagrams illustrating examples of how the correction charts and stabilization charts output from the printer as a result of printing control by the image processing apparatus according to Embodiment 2 overlap one another when the sheaf of charts are placed on a document tray.
Figure 10B:
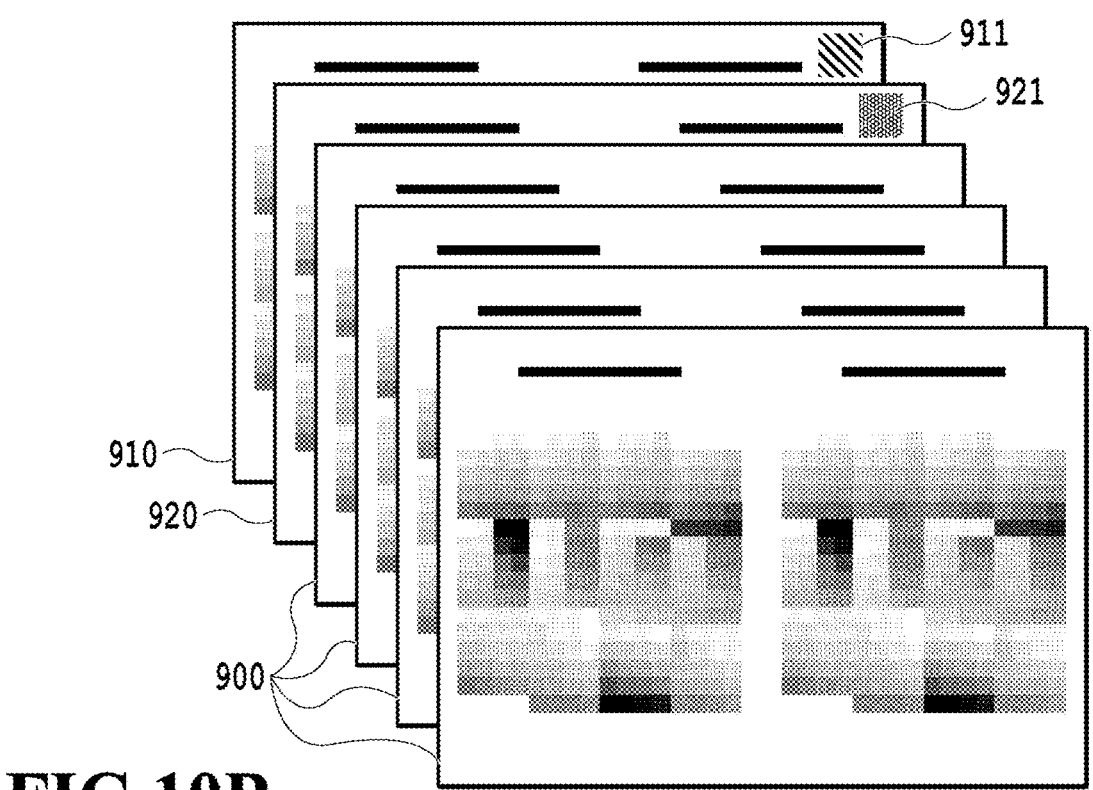

FIGS. 10A and 10B are diagrams illustrating examples of how the correction charts 910 and 920 and stabilization charts 900 output from the printer 140 as a result of the printing control by the image processing apparatus 100 according to Embodiment 2 overlap one another when the sheaf of charts are placed on a document tray 400. FIG. 10A is a diagram exemplarily illustrating a case where the sheaf of charts is placed on the document tray 400 in the order in which the charts were output from the printer 140. The obtaining unit 102 controls the ADF unit to sequentially convey all charts with the pick-up rollers 404 one by one starting from the chart on the nearest side in FIG. 10A (the first stabilization chart 900). In doing so, the obtaining unit 102 simultaneously controls the scanner 130 in addition to the ADF unit to individually scan the charts with the CIS 408. The obtaining unit 102 obtains the pieces of scan image data corresponding to the charts obtained by the scans.

The generation unit 103 firstly identifies the pieces of scan image data corresponding to the plurality of correction charts from among the plurality of pieces of scan image data obtained by the obtaining unit 102 based on the identification images appearing in the scan images. Then, the generation unit 103 generates (updates) conversion tables by using the plurality of identified pieces of scan image data (the pieces of scan image data corresponding to the plurality of correction charts). Specifically, for each piece of scan image data obtained by the obtaining unit 102, the generation unit 103, for example, determines which color many of the pixels in a predetermined image region have among cyan, magenta, and the background color (e.g., white). If determining that there are many pixels in a color close to cyan for a piece of scan image data, for example, the generation unit 103 identifies that piece of scan image data as the one corresponding to the first correction chart 910. If determining that there are many pixels in a color close to magenta for a piece of scan image data, for example, the generation unit 103 identifies that piece of scan image data as the one corresponding to the second correction chart 920. If there are many pixels in a color close to the background color for a piece of scan image data, for example, the generation unit 103 may identify that piece of scan image data as one corresponding to a stabilization chart 900.

In a case where the charts in the chart sheaf are in the order exemplarily illustrated in FIG. 10A, the generation unit 103 identifies the correction charts 910 and 920 as follows. Specifically, in this case, the generation unit 103 identifies the pieces of scan image data corresponding to the first, second, fourth, and fifth charts as the pieces of scan image data corresponding to the stabilization charts 900 since no identification image is printed. The generation unit 103 identifies the piece of scan image data corresponding to the third chart as the piece of scan image data corresponding to the first correction chart 910 since the identification image 911, which is associated with the first correction chart image, is detected. Similarly, the generation unit 103 identifies the piece of scan image data corresponding to the sixth chart as the piece of scan image data corresponding to the second correction chart 920 since the identification image 921, which is associated with the second correction chart image, is detected.

FIG. 10B is a diagram exemplarily illustrating a case where, when the sheaf of charts output from the printer 140 was placed on the document tray 400, the order of the charts in the chart sheaf changed. In a case where the charts in the chart sheaf placed on the document tray 400 are in the order illustrated in FIG. 10B, the generation unit 103 identifies the correction charts 910 and 920 as follows. Specifically, in this case, the generation unit 103 identifies the pieces of scan image data corresponding to the first to fourth charts as the pieces of scan image data corresponding to the stabilization charts 900 since no identification image is printed. The generation unit 103 identifies the piece of scan image data corresponding to the fifth chart as the piece of scan image data corresponding to the second correction chart 920 since the identification image 921, which is associated with the second correction chart image, is detected. Similarly, the generation unit 103 identifies the piece of scan image data corresponding to the sixth chart as the piece of scan image data corresponding to the first correction chart 910 since the identification image 911, which is associated with the first correction chart image, is detected.

Processing flows for the image processing apparatus 100 according to Embodiment 2 are similar to ones in the flowcharts exemplarily illustrated in FIGS. 7 and 8, and detailed description thereof is therefore omitted. The image processing apparatus 100 according to Embodiment 2 controls the printing of a correction chart including a correction chart image and an identification image corresponding to the correction chart image in each of the processes of S705 and S707 illustrated in FIG. 7. Also, the image processing apparatus 100 according to Embodiment 2 identifies the correction charts based on their identification images in the process of S804 illustrated in FIG. 8.

The image processing apparatus 100 configured as described above can save the user's trouble in a case of printing a plurality of correction charts and stabilization charts and performing automatic tone correction with the plurality of correction charts among the plurality of printed charts. Moreover, the image processing apparatus 100 can generate right conversion tables to be generated even in a case where the order in which the plurality of charts are scanned by the scanner 130 is different from the order in which the plurality of charts were output from the printer 140.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to save a user's trouble in a case of printing a plurality of correction charts and stabilization charts and performing automatic tone correction with the plurality of correction charts among the plurality of printed charts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more hardware processors; and
one or more memories storing one or more programs configured to be executed by the one or more hardware processors, the one or more programs including instructions for:
performing control for printing a print image on a print medium;
obtaining data of a scan image obtained by reading a document; and
generating a conversion table for converting a tone of the scan image,
wherein control for printing a plurality of correction chart images along with identification images on a plurality of the print media in a one-to-one correspondence is performed, the plurality of correction chart images being aimed at different purposes for tone correction, the identification images being for respectively identifying the plurality of correction chart images,
control for printing a stabilization chart image on one or more of the print media is performed before performing the control for printing the plurality of correction chart images, the stabilization chart image being for stabilizing the printing of the plurality of correction chart images,
data of a plurality of scan images are obtained, the plurality of scan images being obtained by reading a plurality of correction charts and one or more stabilization charts as a plurality of the documents, the plurality of correction charts being obtained by printing the correction chart images along with the identification images corresponding to the correction chart images on a plurality of the print media in a one-to-one correspondence, the stabilization charts being obtained by printing the stabilization chart image on a plurality of the print media in a one-to-one correspondence, and the scan images respectively corresponding to the plurality of correction charts are identified from among the plurality of scan images based on the identification images appearing in the scan images, and a plurality of the conversion tables are generated using the scan images respectively corresponding to the plurality of identified correction charts.

2. The image processing apparatus according to claim 1, wherein
the control for printing, on one or more of the print media, the stabilization chart image for stabilizing the printing of each of the plurality of correction chart images is performed before performing the control for printing each of the plurality of correction chart images, and
data of the plurality of scan images obtained by reading the plurality of correction charts and a plurality of the stabilization charts as a plurality of the documents are obtained.

3. The image processing apparatus according to claim 1, wherein control for printing the identification images in mutually different forms respectively on the plurality of correction charts is performed.

4. The image processing apparatus according to claim 1, wherein control for printing the identification images at mutually different positions respectively on the plurality of correction charts is performed.

5. The image processing apparatus according to claim 1, wherein at least one of the plurality of correction chart images is for generating the conversion table to be used in tone conversion for generating a halftone pattern by performing dither processing on the scan image.

6. An image processing apparatus comprising:
one or more hardware processors; and
one or more memories storing one or more programs configured to be executed by the one or more hardware processors, the one or more programs including instructions for:
performing control for printing a print image on a print medium;
obtaining data of a scan image obtained by reading a document; and
generating a conversion table for converting a tone of the scan image,
wherein control for printing a plurality of correction chart images on a plurality of the print media in a one-to-one correspondence is performed, the plurality of correction chart images being aimed at different purposes for tone correction,
control for printing a stabilization chart image on a designated number of the print media to be output is performed before performing the control for printing the plurality of correction chart images, the stabilization chart image being for stabilizing the printing of the plurality of correction chart images, the number of the print media to be output being one or more,
data of a plurality of scan images are obtained, the plurality of scan images being obtained by reading a plurality of correction charts and one or more stabilization charts as a plurality of the documents, the plurality of correction charts being obtained by printing the plurality of correction chart images on a plurality of the print media in a one-to-one correspondence, the stabilization charts being obtained by printing the stabilization chart image on a plurality of the print media in a one-to-one correspondence, and
the scan images respectively corresponding to the plurality of correction charts are identified from among the plurality of scan images based on the number of the print media to be output, and a plurality of the conversion tables are generated using the scan images respectively corresponding to the plurality of identified correction charts.

7. The image processing apparatus according to claim 1, wherein at least one of the plurality of correction chart images is for generating the conversion table to be used in tone conversion for generating a halftone pattern by performing error diffusion processing on the scan image.

8. The image processing apparatus according to claim 1, wherein at least one of the plurality of correction chart images is for generating the conversion table to be used in tone conversion for generating a halftone pattern by performing screen processing on the scan image.

9. The image processing apparatus according to claim 6, wherein at least one of the plurality of correction chart images is for generating the conversion table to be used in tone conversion for generating a halftone pattern by performing dither processing on the scan image.

10. The image processing apparatus according to claim 6, wherein
the control for printing, on the number of the print media to be output, the stabilization chart image for stabilizing the printing of each of the plurality of correction chart images is performed before performing the control for printing each of the plurality of correction chart images, and
data of the plurality of scan images obtained by reading the plurality of correction charts and a plurality of the stabilization charts as a plurality of the documents are obtained.

11. The image processing apparatus according to claim 6, wherein the number of the print media to be output is designated based on an input operation by a user.

12. The image processing apparatus according to claim 6, wherein the number of the print media to be output is more than or equal to a number necessary for stabilizing the printing of each of the plurality of correction chart images.

13. The image processing apparatus according to claim 6, wherein at least one of the plurality of correction chart images is for generating the conversion table to be used in tone conversion for generating a halftone pattern by performing error diffusion processing on the scan image.

14. The image processing apparatus according to claim 6, wherein at least one of the plurality of correction chart images is for generating the conversion table to be used in tone conversion for generating a halftone pattern by performing screen processing on the scan image.

15. An image processing method comprising the steps of:
performing control for printing a print image on a print medium;
obtaining data of a scan image obtained by reading a document; and
generating a conversion table for converting a tone of the scan image,
wherein control for printing a plurality of correction chart images along with identification images on a plurality of the print media in a one-to-one correspondence is performed, the plurality of correction chart images being aimed at different purposes for tone correction, the identification images being for respectively identifying the plurality of correction chart images,
control for printing a stabilization chart image on one or more of the print media is performed before performing the control for printing the plurality of correction chart images, the stabilization chart image being for stabilizing the printing of the plurality of correction chart images,
data of a plurality of scan images are obtained, the plurality of scan images being obtained by reading a plurality of correction charts and one or more stabilization charts as a plurality of the documents, the plurality of correction charts being obtained by printing the correction chart images along with the identification images corresponding to the correction chart images on a plurality of the print media in a one-to-one correspondence, the stabilization charts being obtained by printing the stabilization chart image on a plurality of the print media in a one-to-one correspondence, and
the scan images respectively corresponding to the plurality of correction charts are identified from among the plurality of scan images based on the identification images appearing in the scan images, and a plurality of the conversion tables are generated using the scan images respectively corresponding to the plurality of identified correction charts.

16. An image processing method comprising the steps of:
performing control for printing a print image on a print medium;
obtaining data of a scan image obtained by reading a document; and
generating a conversion table for converting a tone of the scan image,
wherein control for printing a plurality of correction chart images on a plurality of the print media in a one-to-one correspondence is performed, the plurality of correction chart images being aimed at different purposes for tone correction,
control for printing a stabilization chart image on a designated number of the print media to be output is performed before performing the control for printing the plurality of correction chart images, the stabilization chart image being for stabilizing the printing of the plurality of correction chart images, the number of the print media to be output being one or more,
data of a plurality of scan images are obtained, the plurality of scan images being obtained by reading a plurality of correction charts and one or more stabilization charts as a plurality of the documents, the plurality of correction charts being obtained by printing the plurality of correction chart images on a plurality of the print media in a one-to-one correspondence, the stabilization charts being obtained by printing the stabilization chart image on a plurality of the print media in a one-to-one correspondence, and
the scan images respectively corresponding to the plurality of correction charts are identified from among the plurality of scan images based on the number of the print media to be output, and a plurality of the conversion tables are generated using the scan images respectively corresponding to the plurality of identified correction charts.

17. A non-transitory computer readable storage medium storing a program for causing a computer to perform a control method of an image processing apparatus, the control method comprising the steps of:
performing control for printing a print image on a print medium;
obtaining data of a scan image obtained by reading a document; and
generating a conversion table for converting a tone of the scan image, wherein control for printing a plurality of correction chart images along with identification images on a plurality of the print media in a one-to-one correspondence is performed, the plurality of correction chart images being aimed at different purposes for tone correction, the identification images being for respectively identifying the plurality of correction chart images, control for printing a stabilization chart image on one or more of the print media is performed before performing the control for printing the plurality of correction chart images, the stabilization chart image being for stabilizing the printing of the plurality of correction chart images, data of a plurality of scan images are obtained, the plurality of scan images being obtained by reading a plurality of correction charts and one or more stabilization charts as a plurality of the documents, the plurality of correction charts being obtained by printing the correction chart images along with the identification images corresponding to the correction chart images on a plurality of the print media in a one-to-one correspondence, the stabilization charts being obtained by printing the stabilization chart image on a plurality of the print media in a one-to-one correspondence, and the scan images respectively corresponding to the plurality of correction charts are identified from among the plurality of scan images based on the identification images appearing in the scan images, and a plurality of the conversion tables are generated using the scan images respectively corresponding to the plurality of identified correction charts.

18. A non-transitory computer readable storage medium storing a program for causing a computer to perform a control method of an image processing apparatus, the control method comprising the steps of:

performing control for printing a print image on a print medium;

obtaining data of a scan image obtained by reading a document; and generating a conversion table for converting a tone of the scan image, wherein control for printing a plurality of correction chart images on a plurality of the print media in a one-to-one correspondence is performed, the plurality of correction chart images being aimed at different purposes for tone correction, control for printing a stabilization chart image on a designated number of the print media to be output is performed before performing the control for printing the plurality of correction chart images, the stabilization chart image being for stabilizing the printing of the plurality of correction chart images, the number of the print media to be output being one or more, data of a plurality of scan images are obtained, the plurality of scan images being obtained by reading a plurality of correction charts and one or more stabilization charts as a plurality of the documents, the plurality of correction charts being obtained by printing the plurality of correction chart images on a plurality of the print media in a one-to-one correspondence, the stabilization charts being obtained by printing the stabilization chart image on a plurality of the print media in a one-to-one correspondence, and the scan images respectively corresponding to the plurality of correction charts are identified from among the plurality of scan images based on the number of the print media to be output, and a plurality of the conversion tables are generated using the scan images respectively corresponding to the plurality of identified correction charts.

\* \* \* \* \*